(12) United States Patent
Harnoy

(10) Patent No.: US 7,798,219 B1
(45) Date of Patent: Sep. 21, 2010

(54) ENHANCED OIL RECOVERY TECHNIQUES USING LIPOSOMES

(76) Inventor: Gideon N. Harnoy, 6 Herman Cohen Street, Tel Aviv (IL) 64385

( * ) Notice: Subject to any disclaimer, the term of this patent is extended or adjusted under 35 U.S.C. 154(b) by 0 days.

(21) Appl. No.: 12/410,490

(22) Filed: Mar. 25, 2009

Related U.S. Application Data

(60) Provisional application No. 61/039,126, filed on Mar. 25, 2008.

(51) Int. Cl.
*E21B 43/29* (2006.01)
*E21B 43/22* (2006.01)
*C09K 8/58* (2006.01)

(52) U.S. Cl. ............... 166/270.1; 166/275; 166/305.1; 166/400; 507/265; 507/936

(58) Field of Classification Search ............ None
See application file for complete search history.

(56) References Cited

U.S. PATENT DOCUMENTS

| 4,323,124 | A | * | 4/1982 | Swan ................... 166/303 |
| 4,811,791 | A | * | 3/1989 | Harnoy et al. ............ 166/305.1 |
| 7,220,709 | B1 | * | 5/2007 | Qu et al. ................. 507/236 |
| 7,354,886 | B2 | * | 4/2008 | Bland et al. ............. 507/116 |
| 2002/0042453 | A1 | * | 4/2002 | Iliopoulos et al. ........ 523/105 |
| 2008/0182763 | A1 | * | 7/2008 | Bland et al. ............ 507/218 |

\* cited by examiner

*Primary Examiner*—George Suchfield
(74) *Attorney, Agent, or Firm*—Brian Roffe

(57) ABSTRACT

Process and a method for enhancing recovery of petroleum from an underground source including injecting into the source, a petroleum displacement agent including fluids and modified liposomes. The liposomes and fluids merge the discrete oil droplets after waterflood into a continuous layer of oil (oil phase) eliminating b-pass of water through oil and employ mobility control through transition of gel phase to liquid crystalline phase.

12 Claims, 5 Drawing Sheets

ENHANCED OIL RECOVERY TECHNIQUES USING LIPOSOMES

CROSS-REFERENCE TO RELATED APPLICATION

This application claims priority under 35 U.S.C. §119(e) of U.S. provisional patent application Ser. No. 61/039,126 filed Mar. 25, 2008, now expired, which is incorporated by reference herein.

FIELD OF THE INVENTION

The present invention relates to a process and a method to enhance recovery of petroleum from an underground source comprising injecting into the source, a petroleum displacement agent comprising fluids and modified liposomes. The liposomes and fluids overcome by-pass of water through oil and thereby increase supplemental recovery efficiency (RE) production of oil from the underground source.

BACKGROUND OF THE INVENTION

Oil recovery from subterranean spaces is initially accomplished by pumping or permitting the oil to flow to the surface of the earth through wells drilled into the oil-bearing stratum.

Oil can be recovered from such producing zones only if certain conditions exist—there must be adequate permeability or interconnected flow channels through the pore network of the oil-bearing stratums to permit the flow of fluids therethrough, and recovery efficiency (RE).

In the primary oil recovery stage, the RE is influenced by the natural energy or drive mechanisms present, such as water drive, gas cap drive, gravity, drainage, liquid expansion, and relative permeability of reservoir formation and combinations thereof within the formation, and this natural energy is utilized to recover petroleum. In this primary stage of oil recovery, the oil reservoir natural energy drives the oil through the pore network toward the producing wells and it is pumped out to the surface.

When natural energy source is depleted, or did not exist in the first place, some supplemental form of artificial energy must be added to continue RE. Waterflooding is a common system to push oil from one depleted well to another depleted well but does not displace oil with high efficiency since water and oil are immiscible and the interfacial tension between water and oil is quite high. Neither the properties nor the location of the remaining residual oil are adequately understood nor are the technologies to reach, mobilize and displace droplets of oil trapped in small capillaries in the reservoir adequately understood.

Accordingly, waterflooding has produced incremental oil recovery amounting to about additional 10 to 15% of the original oil in place (OOIP). Efforts have been made to utilize certain chemicals, mostly surfactants, to decrease the interfacial tension (IFT) between the water being injected and the reservoir oil, followed by research and study of imbibitions and capillary forces in order to displace the trapped oil in the underground formation and bring it to the surface. Such a technique is referred to as surfactant flooding.

However, problems have occurred with such waterflooding and have not been not solved by surfactant flooding, mainly bypass of fluids through the oil interphase structure wherein the oil phase breaks down to oil droplets due to changes in interfacial tension, imbibitions, and capillary forces between oil and water, with the oil droplets becoming trapped in the subterranean structure. Though chemicals flooding added RE, it does not solve the bypass ("fingering") of fluids through the oil. No satisfactory stable displacement material or technique has been found to overcome the bypass of the fluid through the oil. The present discovery provides a process and a method which overcome that obstacle.

U.S. Pat. No. 4,811,791, U.S. patent application Ser. No. 07/322,601 and U.S. Pat. No. 5,244,574 are based on reducing interfacial tension (IFT) capillary forces, mainly between oil and water, to recover oil from different physical states (oil reservoir, oil spill on water, contaminates oil wells and surfaces). In the '601 application, soybean lecithin described in example 23 was dispersed as small unilamellar vesicles (SUV). It was discovered that using surfactant G23 on water broke up a continuous thin oil layer spread on top of water phase; into discrete oil droplets each of which is surrounded by monomolecular layer of phospholipids to enable recover oil spills on water.

SUMMARY OF THE INVENTION

An important and unique aspect of the present invention is the use of a modified liposome and body of fluids in an amount effective to enable discrete oil droplets entrapped in small capillaries to coalesce into a continuous layer of an oil phase on top of a water phase eliminating by-pass of fluids through oil and consequently increasing petroleum recovery efficiency (RE).

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

In accordance with the invention, the modified liposome has the ability to move with the mobile phase, to stick to the stationary phase to move up with the solvent front, and therefore represents the most suitable modified vehicle to stabilize the oil phase. Consequently, the modified liposome causes massive discrete droplets of oil to coalesce to the residual oil phase on top of the water phase.

In this invention, the term "modified liposome" is intended to include all phospholipid spheres, or vesicles, in which at least one acyl group has been replaced by a complex phosphoric acid, which phospholipid spheres or vesicles have been modified, that is replaced by a complex phosphoric acid ester and processed further.

Figure 1:
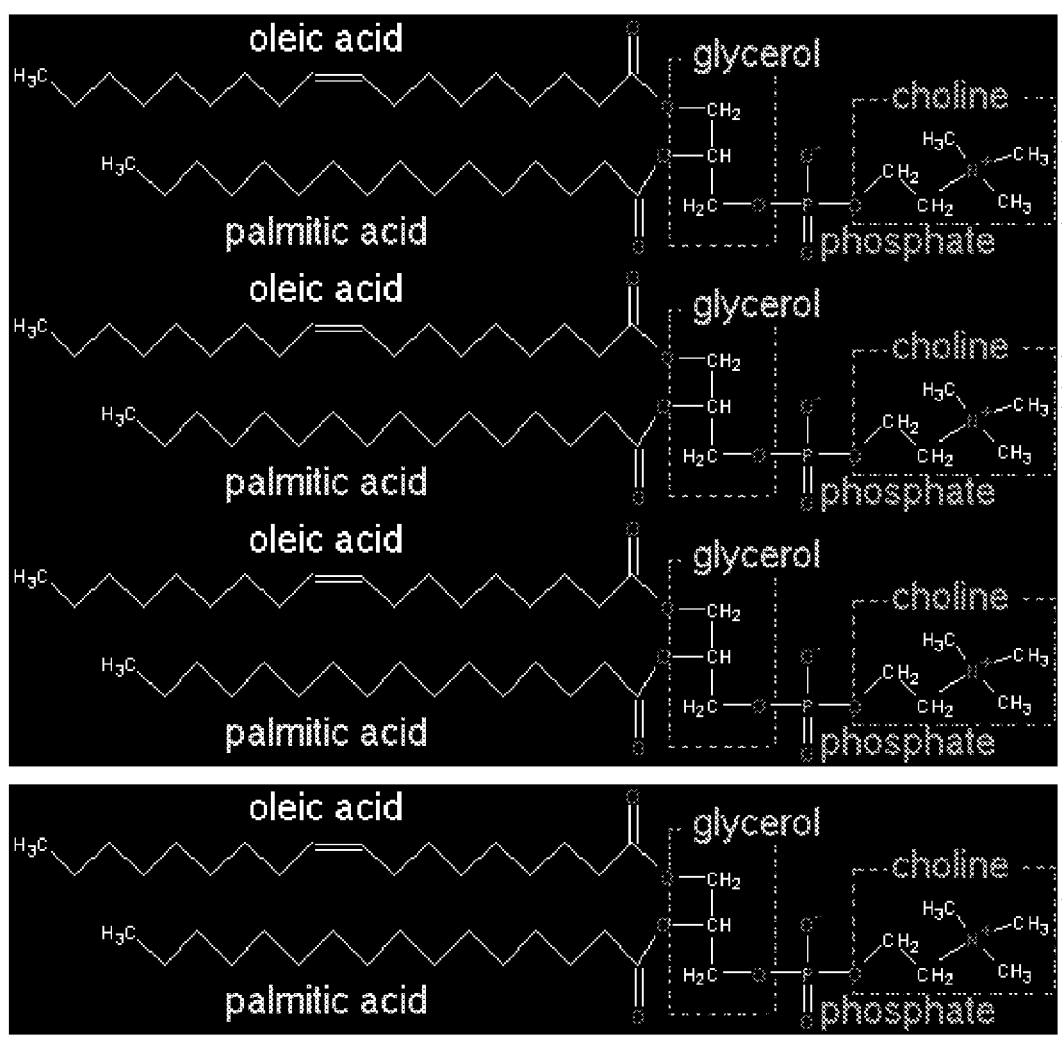
FIG. 1 shows an aggregate of four units of Phosphatidylcholine.

The most common phospholipids and most suitable for the present invention are lecithins; also referred to as phosphatidylcholines (PC), also referred to processing phosphatidylethanolamine (PE) to PC, and of which an aggregate of four units is shown in FIG. 1.

Figure 2:
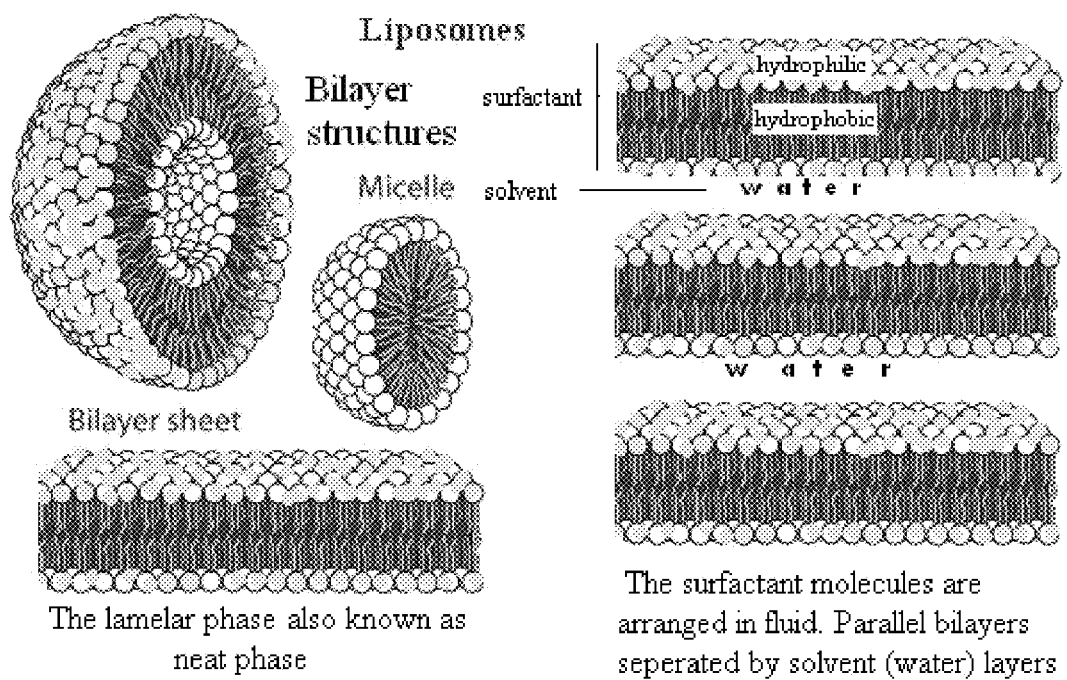
FIG. 2 shows liposomes.

While most surfactants act by solubilization and formation of micelles, in this invention the phospholipids form sealed liposomes, shown in FIG. 2, well defined as active agents having a bilayer structure, and serves as mean to reduce the interaction between oil and water. The invention can therefore include the step of directing a surfactant that does not form micelles in water by itself into the oil producing channels.

Since liposomes can be described as a function of the number of bilayers present or as function of the method of preparation, the manner in which they are produced is not believed to be critical to this invention.

Liposome is dependent on the presence of water molecule. The driving force for liposome formation is the hydrophobic effect which is dependent on the presence of water molecules. Liposome is considered as a dispersion of sealed vesicles rather than liquids.

Figure 5:
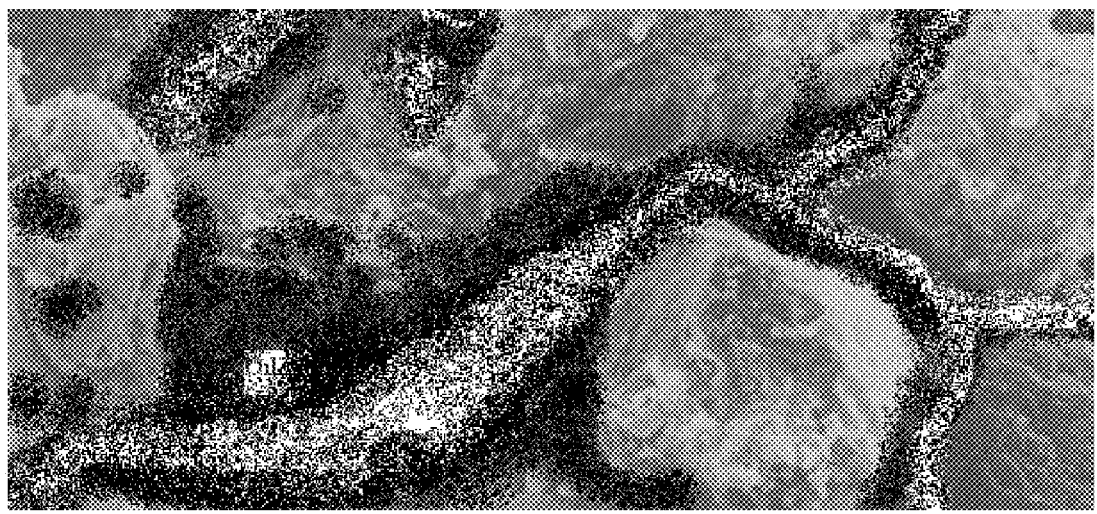
FIG. 5 shows a dispersion of small unilamellar vesicle (SUV) polar phospholipids sealed vesicles (liposome) with fluids inside, at temperature 42° C. and above, and relates to manners, processes and methods to stabilize the oil phase on top of the water and overcome bypass ("fingering") of water through oil and mobilize residual oil.

Liposome formation in the application is also dependent on modification of the lecithin performed by peroxidation of small polar alcohols lipids and their function is actually improved upon further peroxidation by (Fe) ions or modified by using a procedure which process phosphatidylethanolamine (PE) to phosphatidylcholine (PC). A dispersion of small unilamellar vesicle (SUV) polar phospholipids non fatty natural lecithin sealed vesicles (liposome) with fluids inside is shown in FIG. 5 and serves to stabilize the oil phase on top of the water phase similar to aqueous phase and start a drive by injecting the said sealed vesicles that eliminates by-pass of water through oil and continue to enhanced oil recovery.

When liposome is present in an amount of up to 100 parts by weight for each 100 parts of fluid, the fluid is present inside the liposome. The phospholipids form well defined and sealed liposomes.

The liposome reduces the IFT of oil/water interface below about 5 millidynes (in example G23 below about 1 millidyne), the liposome remains almost 100% active agent after one year of shelf life at room temperature, and does not have any impact on the environment, is well dispersed in about 13.5% salinity, where low quality lipids are used. The liposomes serve as a means that affect the interaction between the oil and its environments. The phospholipids comprising the nano size liposome vesicles have a value of hydrophilic/lipophilic balance. Value of hydrophilic-lipophilic balance (HLB) of a surfactant is a measure of the degree to which it is hydrophilic or lipophilic meaning decrease or increase one of them. Immediately, the nano size liposome vesicle value of HLB in the liposome has an influence on the capillary forces in the porous media.

With respect to the size of the liposomes, their size may be 30 Angstrom, but this size will be difficult to achieve. In general, the size of the liposomes can be described as a function of the number of bilayers present and diameter may be from 0.025 microns to 0.05 microns. Also, a nano size around 200 angstrom (10 angstrom=1 nm) is possible.

A variety of methods for producing the liposomes are known and available, for example:

(i) A thin film of the phospholipid is hydrated with an aqueous medium followed by mechanical shaking or sonic irradiation or extrusion through a suitable filter;

(ii) Dissolution of the phospholipid in a suitable organic solvent, mixing with an aqueous medium followed by removal of the solvent; or (iii) Use of gas above its critical point (i.e., freons and other gases such as $CO_2$ or mixtures of $CO_2$ and other gaseous hydrocarbons) wherein since gas is a fluid, liposome formation occurrence depends on the presence of fluid.

In general, the foregoing methods produce liposomes with heterogeneous sizes from about 0.02 microns to about 10 microns or greater, as will be discussed hereinafter, liposomes which are around 200 Angstrom (20 nm) small unilamellar vesicle (SUV) and well defined in size are preferred for use in the present invention.

Figure 3:
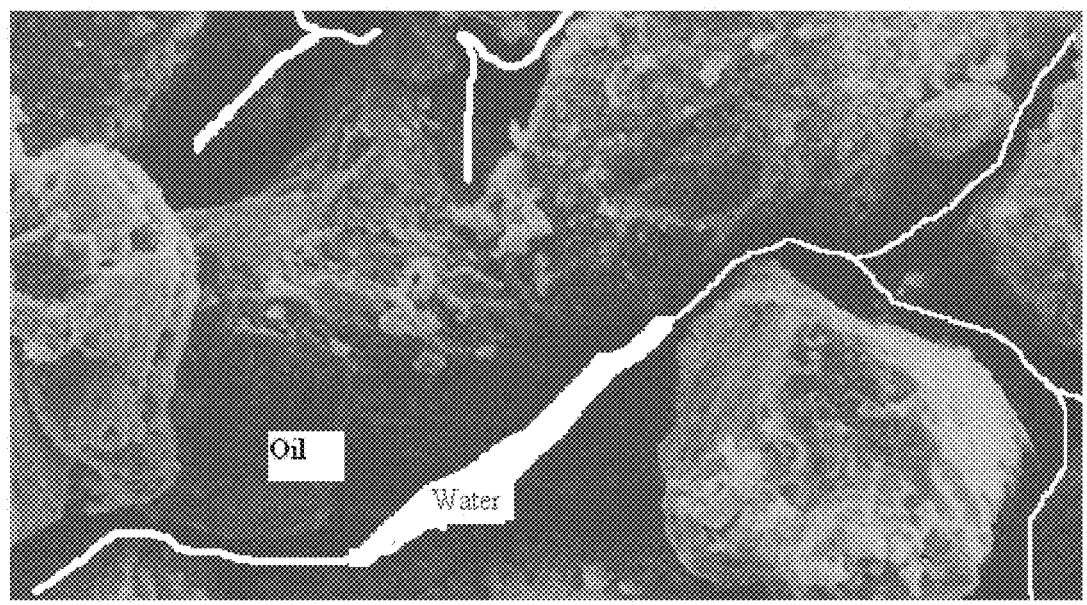
FIG. 3 shows an oil wet reservoir in which aqueous phase drive, gas cap and gravity are pushing about 15% of the original oil in place and followed by injecting water into the porous media pushing an additional about 15% of the Original Oil In Place (OOIP).
Figure 4:
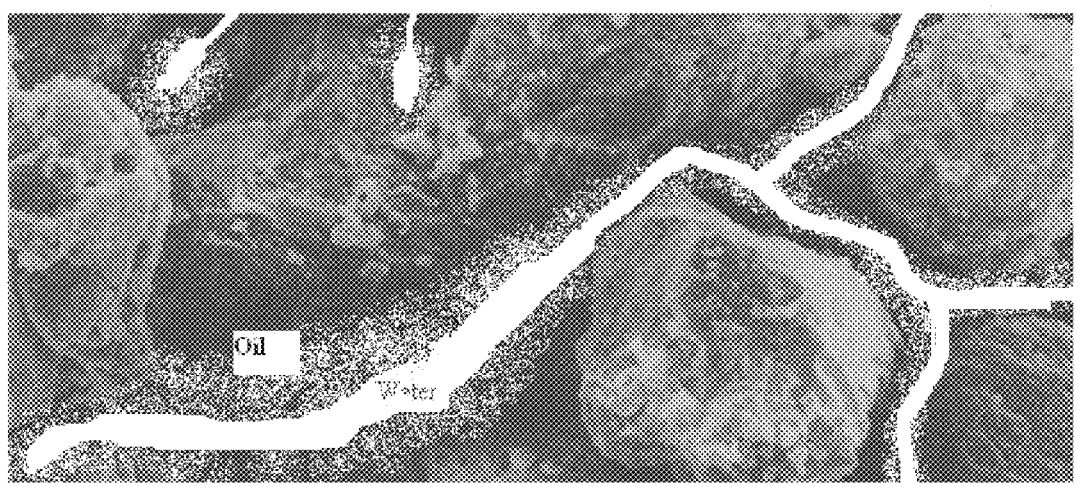
FIG. 4 shows that once the oil phase breaks down into droplets due to changes in the interfacial tension, imbibitions and capillary force between the oil/water interphase, only water and 70% of the original oil in place (OOIP) remains in the porous media, the well is thus considered as a depleted well.

The nano sized vesicles do not aggregate in the porous media or on storage, thus reducing potentially serious blockage or plugging problems when the modified liposomes are injected into the porous oil-bearing stratum and enable release of trapped discrete oil droplets in heterogeneous capillaries. As an example, FIG. 3 shows the aqueous phases (an oil phase on top of a water phase) drive Gas cap and Gravity are pushing 15% of the original oil in place (OOIP) and followed by injection of water into the porous media that pushes an additional 15% of the Original Oil In Place (OOIP) from the producing channels. Then, FIG. 4 shows that once the oil phase breaks down into discrete droplets, the droplets mainly adhere and are absorbed to faces of producing channels due to changes in the interfacial tension and capillary action between the oil/water interphase, and thereafter, only water flows and by-passes the trapped oil and about 70% of the original oil in place (OOIP) remains in the porous media, so that the well is considered as a depleted well.

Finally, liposomes which have been sized down to nano size liposomes show uniform distribution and are 100 percent active after 12 months of shelf life at room temperature.

As previously noted, the modified liposomes can be utilized with any of the enhanced recovery techniques. If utilized in the primary recovery where waterflooding is also utilized, it can be incorporated into the waterflood. In cases in which brine solutions and even highly concentrated brine solutions are utilized, the modified liposome of the present invention can be utilized either alone or as part of any conventional surfactant system, whether it be a carboxylate surfactant system or one utilizing lyotropic liquid crystals of any type. Such surfactant systems often contain chlorinated hydrocarbons; such are not effective when bypassing occurred during flooding when used for enhanced oil recovery.

It has been found that the modified phosphatides of the present invention are stable not only in high concentrations of saline but also stable in hard water; that is, those containing large amounts of a polyvalent metal such as calcium and magnesium. The amount of modified liposome in the waterflood can be as low as about 0.5%. For water flooding, the modified liposome can be utilized in any of the convention waterflooding procedures.

The modified liposome of the instant invention can also be used with the LPG or other gas miscible slug process. In the LPG technique liquefied petroleum gas (LPG); such as ethane, propane, or butane, immiscible with the typical reservoir of oil and equal to about 5% of pore volume, is injected into the well and then this slug is followed by either a natural gas or gas, and water which pushes the slug through the reservoir. Since LPG products are "first contact" miscible with the oil, meaning that they are miscible with the oil immediately upon contact, they will pick up the oil as a bank in front of the slug. The slug is maintained in a liquid state in order to maintain its miscibility with the oil in the underground formation by maintaining it under the pressure necessary to keep it liquid. For propane, for example, this is about 1,000 to 1,300 psi or higher at typical oil reservoir temperatures, but will break the oil phase into droplets causing bypass of water through the droplets of oil.

With the instant invention, the efficiency of recovery by these methods, unsatisfactory sweep area efficiencies and a correspondingly low overall efficiency of such process of enhanced recovery, is greatly increased. It is believed that this is due based on the fact that it is known in oil recovery procedures that an oil displacement process is most efficient when the viscosity of the displacing fluid is equal to the viscosity of the displaced fluid. Since gas, whether LPG or any of the other gases, is used for recovery such as carbon dioxide, nitrogen, or light hydrocarbons is less viscous and more mobile than most of the crude oils in the reservoirs, they are not efficient oil displacement agents. By adding modified liposomes of the present invention to the gas-water flood recovery, the process is greatly improved.

It has also been noted that the amount of gas needed to obtain high oil recovery is also decreased inasmuch as the presence of the modified liposome causes the gas to be confined to the zone of interest and prohibits the gas from channeling through high permeability strata and thereby becoming lost or unavailable for oil recovery. The modified liposomes can be introduced either in the gas slug or directly into the reservoir by means of a water or oil/fluid vehicle prior to, during, or even after as alternative to slugs of water and gas injection that are made into the well.

Flooding techniques in which micelle solutions are utilized are now commonly accepted tertiary recovery procedures. Micellar flooding utilizes micellar solutions in slugs followed by driving water in order to recover the oil. Such micellar solutions conventionally are a combination of a surfactant, a hydrocarbon, an electrolyte in order to adjust the viscosity of the solution, and often with a co-surfactant. This process is utilized in a conventional flooding technique. That is, a slug of the micellar solution is formed in the reservoir by injecting a volume of such micellar solution into the formation. The slug moves through the formation displacing part of the oil bypass the oil and producing less oil more water ahead of it toward the producing well.

In the following examples, several compounds are used, namely G-4, G-10 and G-23. G-4 and G-10 are prior art liposome formulations.

G-23 is a product of the present invention. As described elsewhere herein, this product is formed from a modification of soybean lecithin containing about 45% of each of phosphatidylcholine (PC) and phosphatidylethanolamine (PE) modified by using a procedure which processes the PE to PC and yields a dispersion of bilayer vesicles (liposomes). About 0.2% Sodium Azide is added to 3% (weight by volume) of liposomal dispersion to prevent bacterial or fungal contamination. The dispersion was further modified by sonic irradiated in 13.5 NaCl water solutions, 5 times its volume. The final dispersion is G-23.

In addition, the following abbreviations are used:

"Soi" (Initial oil saturation) denotes the volume of brine displaced from the core by the initial oil pumped into the core;

"Sow" (oil saturation at the end of Waterflooding) denotes the volume of oil displaced from the core by the waterflood;

"Soc" (final oil saturation in the core after chemical flooding) denotes the total volume of the oil displaced after the chemical flood; and "Re" (Recovery efficiency) denotes the volume of oil recovered from the core versus the volume of oil pump into the core.

EXAMPLES

1. A coreflood (GH-3) at about 60° C., using hexadecane as the oil and 15% wt/vol NaCl as the brine was prepared as above and waterflooded to residual oil saturation. A displacement experiment conducted at about 1.5 ft/d used a formulation (2.2 pore volume slug) of about 0.5% G-4 in about 15% NaCl. G-4 was sonicated to produce a dispersion that would easily filter through about 0.2 micron filter paper. The IFT at ambient was 0.041 dyne/m and less than about 0.001 dyne/nm at about 60° C. The injected formulation had a viscosity of about 1.1 cp. A mobility buffer (1.47 pore volume) of FLOCON 4800 biopolymer having a viscosity of about 11.2 cp. was injected to displace the liposome. An additional polymer slug containing about 3% IPA and FLOCON 4800 was then injected for one pore volume in an attempt to displace the liposome. A summary of the coreflood and oil/water ratio is presented below.

| Cor  | Soi  | Sow  | Soc  | Re   |
|------|------|------|------|------|
| GH-3 | 66.2 | 27.2 | 24.4 | 10.3 |

2. A core flood (GH-5) at about 60° C., using hexadecane as the oil and wt/vol 15% NaCl as the brine was prepared as above and waterflooded to residual oil saturation. The displacement experiment conducted at one ft/d shows the effect of a number of methods of liposome preparation. A liposome formulation (1.1 pore volume slug) corresponding to about 0.5% G-10 in about 15% NaCl was prepared so that the dispersion would easily filter through 0.22 micron filter paper. The IFT at ambient or room temperature was about 0.667 dyne/cm and 0.0048 at a temperature of about 60° C. and the formulation had a viscosity of about 1.1 cp. A second liposome slug prepared by sonication of G-10 was injected (0.7 pore volume, 0.5% G-I0 in 15% NaCl). This sonicated material filtered through a 0.22 micron filter but plugged a 0.1 micron filter after ca. 15 ml. A third slug (one pore volume) of the sonicated G-10 was viscosified with FLOCON 4800 biopolymer such that the viscosity of the of resulting slug is about 4.5 cp. at about 60° C. The resulting IFT of the viscosified liposome slug was higher, 0.0184 dyne/nm at 60° C. A fourth slug containing just FLOCON 4800 was then injected for 0.7 pore volume. A summary of the coreflood and the oil/water ratio is presented below

| Core  | Soi   | Sow   | Soc   | Re    |
|-------|-------|-------|-------|-------|
| GH-10 | 66.77 | 34.45 | 26.01 | 24.49 |

3. A coreflood (GH-10-2) at about 42° C. using Sho-Vel-Tum's oilfield oil (Texaco Vess Unit commingled oil) as the Oil, and Sho-Vel-Tumoilfield brine (108,000 ppm) as the brine was prepared and waterflooded to residual oil saturation. The experiment conducted at one ft/d shows the effect of a low concentration slug containing about 0.5% of G-23 in Sho-Vel-Tum oil & brine. A total of about 55.8 ml or 0.85 pore of surfactant was injected. The size of the liposomes in the dispersion was about 350 Angstrom. IFT measurement were taken with the brine and the oil of the Sho-Vel-Tum oilfield at a temperature of about 62.8° C. and the test was run for 3 days showing stable results starting with 0.0064 dyne/nm immediately to 0.0100 dyne/nm after 3 days. The viscosity of the oil was about 11.1 cp.

Oil density: 0.8864 g/cc.
Porosity: 20.49
Permeability: 118.
Core dimensions: length 28 (cm) diameter 3.81 (cm) bulk volume: 391.23 (cc).
Core set-up: encapsulation—Hasseler type. Overburden (psi) 600.

The flood shows that oil starts to be produced at 0.54 pore volume of surfactant injected and oil banks shortly thereafter (see tube 17-30 Table IV). Most of the oil is produced by one pore volume. In some of the tubes the oil-cuts are 50%. A summary of the coreflood and oil water ratio is presented below.

| Core | Soi | Sow | Soc | Re % |
|---|---|---|---|---|
| GH 10-2 | 42.20 | 29.45 | 13.62 | 53.74 |

Sample G23

A commercial preparation of soybean lecithin, containing about 45% each of Phosphatidylcholine (PC) and phosphatidylethanolamine (PE) and less than 4% of phosphatidylinositol (PI) was modified using a procedure which converted the PE to PC with an efficiency of 95-100%.

The product G-23 was dispersed as small unilamellar vesicles (SUV). About 0.2% Sodium Azide was added, to 3% (weight by volume) of liposomal dispersion to prevent bacterial or fungal contamination.

G23 was stored at room temperature.

After one year of storage G23 dispersion did not show aggregation, coalescence or sedimentation and remained stable showing no change in the physical appearance.

Then about 3% of G23 dispersion was sonic irradiated in 13.5 NaCl water solutions, 5 times its volume, and interfacial tension measurements were conducted against different kinds of oil.

The result of G23 interfacial measurement is shown in Table I.

Experiment 1 with G23

A sample of G23 was tested on a layer of oil poured into a glass of water an instant conversion of the oil into discrete oil droplets adhered to the glass and easily could be skimmed. The described adhesion is connected with the wettability of the solid glass and refers to the tendency of oil fluid adhere to the solid surface in the presence of other immiscible fluids. Since the oil distribution was influenced by the glass wettability, adhesion spread as well and the wettability occurrence is considered in conjunction of oil contact angel to glass recovering oil spill on water.

The underground heterogeneous hydrocarbon solid interface, contradiction to glass, is considered as "low energy" and contact angle occurrence is not well understood. The tendency of discrete oil droplets adhere to the hydrocarbon interface is marshaled in this invention by modified nano liposome and interaction in underground physical state. Nano size liposome caused a massive reduction (up to 10-50 thousand fold) of the interfacial tension, enabling oil molecules to break out of capillaries coalesce and adhere to the oil phase.

It is well-known that ultralow tensions (less than about 0.01 dyne/cm) occur between two phases provided they are sufficiently close to a critical point since by definition the two phases become identical and the interfacial tension reaches zero at their critical point. Liquid-vapor critical points, solution critical points, and plait points are commonly observed critical points.

Density of fresh water injected to core is 4° C. (1 g/cm$^3$). Heat of water inside core is 42° C. (0.9922 g/cm$^3$). Since water is heat absorbent, water phase will remain almost same: Water at 80° C. (0.9718 g/cm$^3$). But water at critical point 100° C. (0.0008 g/cm) Vapor Phase interfacial tension tends to reach to about 0. Oil density at core temperature of about 42° C. is (0.8864 g/c$^3$) comparing densities of water and oil; oil in the core is lighter then water by about 10.67%. The critical point in water 100° C. changes the phase from fresh water to vapor and interfacial tension tends to 0.

TABLE I

Measuring interfacial tension
Minimum Interfacial tension measurements (IFT) were conducted on Thermostated
University of Texas Spinning Drop Tensiometer. Liposome G23 results shows:

| Sample No. | Conc. % | Prep. Method | IFT Millidyne/cm | Oil | NaCl SI | Isopropyl Alcohol % | Temp. C. | Size Å |
|---|---|---|---|---|---|---|---|---|
| G-23 | 0.5 | A | 0.0064 | Oilfield | 13 | NONE | 62.8 | 350 |

* IFT was running for 72 hours and chanced to 0.0100 Millidyne/cm

The inputs of the theory are the Holmholtz free energy density of homogeneous fluid and what are known as influence parameters cap of inhomogeneous fluids—this being measures of the free energy stored in fluid component density gradients. The gradient theory reveals that interfacial tension depends on the topography of the homogeneous free-energy surface in component density and the values of influence parameters which gauge the effective.

The nano size bilayer liposome vesicle, densities of water/oil at core coalesce and move discrete oil droplets trapped in the capillaries toward the residual oil phase on top of water molecule layers. The liposome the nano bilayer vesicle in the core.

TABLE II

Salinity tolerance measurements

| Sample | Concentration % | NaCl % | Ca + 2 (ppm) |
|---|---|---|---|
| G-10 | 1 | 15 | 5000 |
|  | 5 | 15 | 50000 |

Experiment 2

The following procedure was used at the National Institute for Petroleum and Energy Research at Bartlesville Okla. in preparing Barea sandstone core.

Barea core, 10 inches long and 1.5 inches in diameter were fired at about 8000° F. for about 24 hours.

The core was cooled and weighed to determine the dry weight before saturation with brine of the desired concentration.

The cores were placed in an evacuation chamber and a vacuum of about 1 mm was pulled on the core for about 2 hours. The core was saturated under partial vacuum with degassed brine and allowed to remain under vacuum for about one hour. The core was removed from the evacuation chamber and weighed to determine saturated core weight.

The pore volume of the core was calculated by the relationship: brine saturated core weight (g)—dry core weight (g), divided by the density of the brine (g/ml)=core volume (ml).

The core was then mounted wet in Hassler sleeve and brine (about 2 pore volumes) was pumped through the core before determining the original permeability to brine.

The Hassler is thermostatically heated to stimulate reservoir temperature.

The brine-saturated core was oil flooded at about 30 ft/day to remove all the displaceable brine. The oil-flood was carried out using a recycling oil system and required about 24 hours. The total brine displaced by the oil saturation was used to calculate initial oil saturation (Soi).

Optionally, oil permeability was determined in a manner analogous to that used above for establishing original permeability to brine. Prior to waterflood, the core effluent line was air blown to remove oil.

The oil-flooded core was waterflooded at 3 to 5 feet per day, until the effluent brine/oil ratio is greater than 99:1.

The total oil displaced is measured and Sow (oil saturation at the end of the waterflood) is calculated. The residual oil volume remaining in the core is calculated by subtracting the volume displaced by the waterflood from the water volume displaced by the oil flood. If desired, water permeability after waterflood can be determined in a manner analogous to that used above for original permeability to brine. Cores were routinely conditioned in this manner prior to carrying out the flooding tests. At this point, the core simulated an oil reservoir that had been exhaustively waterflooded. The slug containing the modified liposome is injected at a slower rate, corresponding to field flow rate of either 1.5 or 1 foot/day as stated for the pore volume specified. The slug may optionally contain a mobility buffer or be followed by a mobility buffer. Oil recovery from the core is measured to determine Soc (final oil saturation after chemical flooding). Oil recovery efficiency of the chemical flooding (RE) is calculated as (Sow−Soc/Soc)×100.

TABLE III

| CORE DIMENSION | | | | |
|---|---|---|---|---|
| LENGTH (cm): | 28.00 | DIAMETER (cm): | 3.81 | BULK VOLUME (cc): 319.23 |

| COREFLOOD SET-UP | | | | |
|---|---|---|---|---|
| ENCAPSULATION: | Hasseler type | TEMP (° C.) | | 42.00 |
| OVERBURDEN (psi): | 600 | BACKPRESSURE (psi) | | 0.00 |

| COREFLOOD FLUIDS | |
|---|---|
| BRINE COMP: | Sho-Vel-Tum brine |
| OIL: | Texaco Vess Unit commingled oil |

TABLE III-continued

| | |
|---|---|
| SURF(S). COMP: | 0.5% G-23 in Sho-Vel-Tum brine |
| POLYMER: | None |
| TRACER: | None |

Purpose of the Flood

Test the oil recovery of a low concentration surfactant flood using 0.5% G-23 as the surfactant without any polymer. The flood is to be approximately one pore volume of surfactant followed by brine. Actual surfactant injected was 0.85 pore volume or 55.8 ml.

| REPORT SECTION | | | |
|---|---|---|---|
| PV (ml) | 65.40 | Sat. % | Oil Rec. ml. |
| INITIAL OIL SATN. (ml) | 42.20 | 64.53 | 12.75 |
| REM. OIL AFTER WATERFLOOD (ml) | 29.45 | 45.03 | 28.58 |
| REM. OIL AFTER CHEMICAL FLOOD (ml) | 13.62 | 20.83 | |
| RECOVERY EFFICIENCY (%) | 53.74 | | |
| POROSITY | 20.49 Percent | | |
| PERMEABILITY | 118.00 | | |
| OIL TYPE | Sho-Vel-Tum brine | | |
| OIL VISCOSITY | 11.10 cp | | |
| OIL DENSITY | 0.8864 g/c$^3$ | | |

TABLE IV-A

Coreflood results

| no | TOTAL VOLUME (ml) | WATER VOLUME (ml) | OIL VOLUME (ml) | SUM of TOT. VOL. (ml) | SUM of .OIL (ml) |
|---|---|---|---|---|---|
| 0 | 0.00 | 0.00 | 0.00 | 0.00 | 0.00 |
| 1 | 4.80 | 1.30 | 3.50 | 4.00 | 3.60 |
| 2 | 13.20 | 4.70 | 8.50 | 18.00 | 12.00 |
| 3 | 12.90 | 12.80 | 0.10 | 30.90 | 12.10 |
| 4 | 13.20 | 13.10 | 0.10 | 44.10 | 12.20 |
| 5 | 13.40 | 13.30 | 0.10 | 57.50 | 12.30 |
| 6 | 13.40 | 13.30 | 0.10 | 70.90 | 12.40 |
| 7 | 13.20 | 13.20 | 0.00 | 84.10 | 12.40 |
| 8 | 13.40 | 13.30 | 0.10 | 97.50 | 12.50 |
| 9 | 13.20 | 13.10 | 0.10 | 110.70 | 12.60 |
| 10 | 13.40 | 13.30 | 0.10 | 124.10 | 12.70 |
| 11 | 13.20 | 13.20 | 0.00 | 137.30 | 12.70 |
| 12 | 13.60 | 13.60 | 0.00 | 150.90 | 12.70 |
| 13 | 12.60 | 12.80 | 0.00 | 163.70 | 12.70 |
| 14 | 13.20 | 13.15 | 0.50 | 176.90 | 12.75 |
| 15 | 12.80 | 12.80 | 0.00 | 189.70 | 12.75 |
| 16 | 13.00 | 13.00 | 0.00 | 202.70 | 12.75 |
| 17 | 3.00 | 2.95 | 0.05 | 205.70 | 12.80 |
| 18 | 4.30 | 4.30 | 0.00 | 210.00 | 12.80 |
| 19 | 4.30 | 4.30 | 0.00 | 214.30 | 12.80 |
| 20 | 4.40 | 4.30 | 0.10 | 218.70 | 12.90 |
| 21 | 4.40 | 4.30 | 0.10 | 223.10 | 13.00 |
| 22 | 4.40 | 4.30 | 0.10 | 227.50 | 13.10 |
| 23 | 4.60 | 4.30 | 0.30 | 232.10 | 13.40 |
| 24 | 4.50 | 4.40 | 0.10 | 236.60 | 13.50 |
| 25 | 4.40 | 4.30 | 0.10 | 241.00 | 13.60 |
| 26 | 4.40 | 3.55 | 0.85 | 245.40 | 14.45 |
| 27 | 4.30 | 3.10 | 1.20 | 249.70 | 15.65 |
| 28 | 4.20 | 1.90 | 2.30 | 253.90 | 17.95 |
| 29 | 4.60 | 2.50 | 2.10 | 258.50 | 20.05 |
| 30 | 4.40 | 2.20 | 2.20 | 262.90 | 22.25 |
| 31 | 4.10 | 2.10 | 2.00 | 267.00 | 24.25 |
| 32 | 4.40 | 2.90 | 2.90 | 271.40 | 25.75 |
| 33 | 4.40 | 3.50 | 3.50 | 275.80 | 26.65 |
| 34 | 4.40 | 3.80 | 3.80 | 280.20 | 27.25 |
| 35 | 4.40 | 4.00 | 4.00 | 284.60 | 27.65 |
| 36 | 4.40 | 4.15 | 4.15 | 289.00 | 27.90 |

TABLE IV-A-continued

Coreflood results

| no | TOTAL VOLUME (ml) | WATER VOLUME (ml) | OIL VOLUME (ml) | SUM of TOT. VOL. (ml) | SUM of .OIL (ml) |
|---|---|---|---|---|---|
| 37 | 4.40 | 4.20 | 4.20 | 293.40 | 28.10 |
| 38 | 4.40 | 4.30 | 4.30 | 297.80 | 28.20 |
| 39 | 4.40 | 4.30 | 4.30 | 302.20 | 28.30 |
| 40 | 4.30 | 4.25 | 4.25 | 308.50 | 28.35 |

Start/End waterflood (1-16). Start/End Surfactant flood (17-30). Start/End Waterflood (31-40)

TABLE IV-B

Coreflood results

| no | Res. Oil. Sat Soc (ml) | OIL Recovered (% PV) | PORE VOLUME INJECTED | Oil/Water Ratio | Oil Cut (%) |
|---|---|---|---|---|---|
| 0 | 64.53 | 0.00 | 0.0000 | | |
| 1 | 89.17 | 8.20 | 0.0734 | 2.6923 | 72.92 |
| 2 | 46.18 | 28.44 | 0.2752 | 1.8085 | 64.39 |
| 3 | 48.02 | 28.67 | 0.4725 | 0.0078 | 0.78 |
| 4 | 45.87 | 28.91 | 0.6743 | 0.0076 | 0.76 |
| 5 | 45.72 | 29.15 | 0.8792 | 0.0075 | 0.75 |
| 6 | 45.57 | 29.38 | 1.0841 | 0.0075 | 0.75 |
| 7 | 45.57 | 29.38 | 1.2859 | 0.0000 | 0.00 |
| 8 | 45.41 | 29.62 | 1.4908 | 0.0075 | 0.75 |
| 9 | 45.26 | 29.86 | 1.6927 | 0.0076 | 0.76 |
| 10 | 45.11 | 30.09 | 1.8976 | 0.0075 | 0.25 |
| 11 | 45.11 | 30.09 | 2.0994 | 0.0000 | 0.00 |
| 12 | 45.11 | 30.09 | 2.3073 | 0.0000 | 0.00 |
| 13 | 45.11 | 30.09 | 2.5031 | 0.0000 | 0.00 |
| 14 | 45.11 | 30.21 | 2.7049 | 0.0038 | 0.38 |
| 15 | 45.03 | 30.21 | 2.9006 | 0.0000 | 0.00 |
| 16 | 45.03 | 30.21 | 3.0994 | 0.0000 | 0.00 |
| 17 | 44.95 | 30.33 | 3.1453 | 0.0169 | 1.67 |
| 18 | 44.95 | 30.33 | 3.2110 | 0.0000 | 0.00 |
| 19 | 44.95 | 30.33 | 3.2768 | 0.0000 | 0.00 |
| 20 | 44.80 | 30.57 | 3.3440 | 0.0233 | 2.27 |
| 21 | 44.65 | 30.81 | 3.4113 | 0.0233 | 2.27 |
| 22 | 44.50 | 31.04 | 3.4786 | 0.0233 | 2.27 |
| 23 | 44.04 | 31.75 | 3.5489 | 0.0698 | 6.52 |
| 24 | 43.88 | 31.99 | 3.6177 | 0.0227 | 2.22 |
| 25 | 43.73 | 32.23 | 3.6850 | 0.0233 | 2.27 |
| 26 | 42.43 | 34.24 | 3.7523 | 0.2394 | 19.32 |
| 27 | 40.60 | 37.09 | 3.8180 | 0.3871 | 27.91 |
| 28 | 37.08 | 42.54 | 3.8823 | 1.2105 | 54.76 |
| 29 | 33.87 | 47.51 | 3.9526 | 0.8400 | 45.65 |
| 30 | 30.50 | 52.73 | 4.0199 | 1.0000 | 50.00 |
| 31 | 27.45 | 57.46 | 4.0626 | 0.9524 | 48.78 |
| 32 | 25.15 | 51.02 | 4.1498 | 0.5172 | 34.09 |
| 33 | 23.78 | 63.15 | 4.2171 | 0.2571 | 20.45 |
| 34 | 22.86 | 64.57 | 4.2544 | 0.1579 | 13.64 |
| 35 | 22.25 | 85.52 | 4.3517 | 0.1000 | 9.09 |
| 36 | 21.87 | 56.11 | 4.4190 | 0.0602 | 5.68 |
| 37 | 21.56 | 66.59 | 4.4862 | 0.0476 | 4.55 |
| 38 | 21.41 | 56.82 | 4.5535 | 0.0233 | 2.27 |
| 39 | 21.25 | 87.06 | 4.6208 | 0.0233 | 2.27 |
| 40 | 21.18 | 87.18 | 4.8865 | 0.0118 | 1.18 |

Start/End waterflood (1-16). Start/End Surfactant flood (17-30). Start/End Waterflood (31-40)

The activity of G23 in coreflood effluent in heat and densities did not result in forming micelles as on water surface were heat and densities are not major factor. The inputs of the theory are the Holmholtz free energy density of homogeneous fluid and what are known as influence parameters cap of inhomogeneous fluids—this being measures of the free energy stored in fluid component density gradients. The gradient theory reveals that interfacial tension depends on the topography of the homogeneous free-energy surface in component density or in composition space and the values of influence parameters which gauge the effective.

It is now discovered that G23 nano size and ultralow IFT stability in high temperature indicates that the discrete oil droplets coalesced to continuous thin oil layer adhere on top of the water molecules layers and thereby enabled Re shown in tube 31-40 due to nano size liposome It was found and discovered that G 23 have the same properties on the water surface as underground with the following main changes between the environments of performance; the discrete oil droplets aggregation and adhesion to "high energy" formed in oil spill on water behave differently in the underground porous at heat and densities environment. Consequently, bypass of water through oil does not occur. The discrete oil droplets coalesced and adhere to the "low energy" surface in the porous media and forms the oil phase on top of the water phase thereby enable additional Recovery efficiency.

Although preferred embodiments are illustrated and described above, this invention is not limited to the above embodiments and should be determined by the following claims.

The invention claimed is:

1. A method for extracting oil droplets from oil producing channels after waterflooding of the oil producing channels has occurred, comprising:
    modifying liposomes by at least one of peroxidation and a procedure which processes phosphatidylethanolamine (PE) to phosphatidylcholine (PC), the liposomes being modified to cause a reduction in the interaction between oil and water such that when interacting with oil and water in the oil producing channels, droplets of oil remaining after the waterflooding coalesce on top of a water phase; and
    directing the modified liposomes into the oil producing channels to cause the oil droplets to form into an oil phase on the water phase and thereby increase recovery efficiency.

2. The method of claim 1, wherein the step of modifying the liposomes comprises forming the modified liposomes as bilayer modified liposomes by a procedure which converts phosphatidylethanolamine (40%) to Phosphatidylcholine (PC) as a dispersion of sealed vesicles mixed with 60% of Phosphatidylcholine.

3. The method of claim 1, further comprising directing a surfactant that does not form micelles in water by itself into the oil producing channels.

4. The method of claim 1, wherein the step of modifying the liposomes comprises forming the modified liposomes from polar phospholipid vesicles in which at least one acyl group has been replaced by complex phosphoric acid ester.

5. The method of claim 4, wherein the phospholipid is a lecithin.

6. A method utilizing displacement agent to extract retention of oil from the surface of oil producing channels after waterflooding of the oil producing channels, comprising:
    modifying liposomes to cause a reduction in the interaction between oil and water such that when interacting with oil and water in oil producing channels, droplets of oil coalesce on top of a water phase; and
    injecting fluid molecules and the modified liposomes into the oil producing channels to cause the liposomes to modify the physical state of retained oil and coalesce discrete droplets of oil from the surface of the oil producing channels thereby forming an oil phase on top of the water phase and enhancing recovery efficiency from the oil producing channels.

7. The method of claim 6, further comprising forming the modified liposomes as bilayer modified liposomes by a procedure which converts phosphatidylethanolamine (40%) to Phosphatidylcholine as a dispersion of sealed vesicles mixed with 60% of Phosphatidylcholine and using the formed bilayer modified liposomes as the modified liposomes being injected with the fluid molecules into the oil producing channels.

8. The method of claim 7, wherein the modified liposome includes polar head Phospholipid.

9. The method of claim 8, further comprising directing only a surfactant that does not form micelles in water by itself into the oil producing channels.

10. The method of claim 6, wherein the liposome comprises a polar head Phospholipid.

11. A method for releasing trapped discrete droplets of oil in oil producing channels, the discrete oil droplets being caused by waterflooding of the oil producing channels, the method comprising:
  modifying liposomes by a procedure which processes phosphatidylethanolamine (PE) to phosphatidylcholine (PC); and
  injecting into the oil producing channels, fluid molecules and the modified liposomes to coalesce the trapped oil droplets into an oil phase on top of a water phase thereby overcoming by-pass of water through an oil bank and enhancing oil recovery efficiency.

12. The method of claim 11, wherein the step of modifying the liposomes comprises forming the modified liposomes as bilayer modified liposomes by a procedure which converts phosphatidylethanolamine (40%) to Phosphatidylcholine (PC) as a dispersion of sealed vesicles mixed with 60% of Phosphatidylcholine.

* * * * *